J. T. WOOLFOLK.
CLEVIS.
APPLICATION FILED AUG. 27, 1917.
1,316,933.
Patented Sept. 23, 1919.
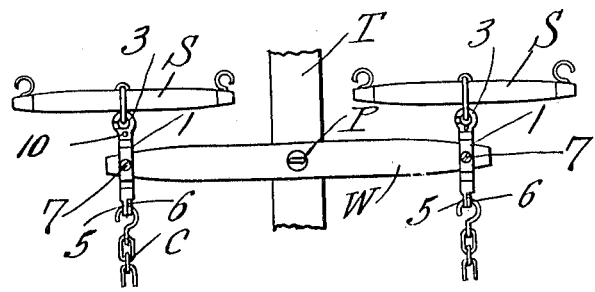
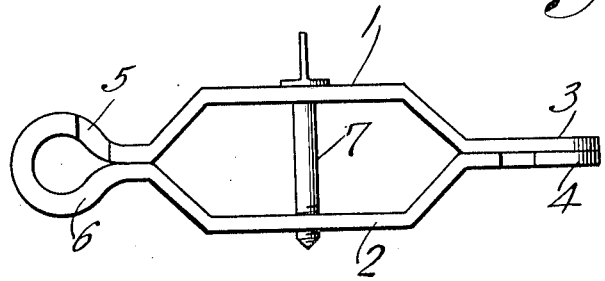 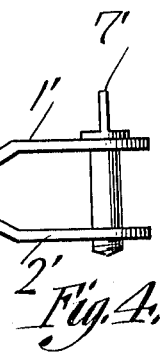
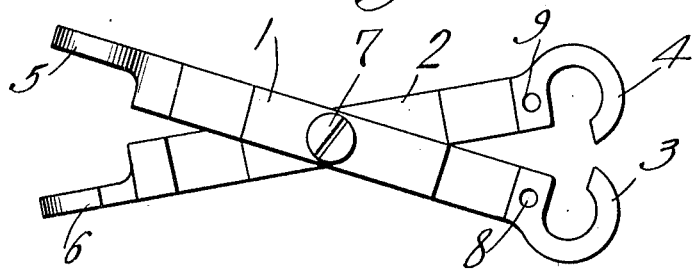
J. T. Woolfolk
Inventor

UNITED STATES PATENT OFFICE.

JOHN THOMAS WOOLFOLK, OF WILDERVILLE, OREGON.

CLEVIS.

1,316,933.  Specification of Letters Patent.  Patented Sept. 23, 1919.

Application filed August 27, 1917. Serial No. 188,406.

*To all whom it may concern:*

Be it known that I, JOHN THOMAS WOOLFOLK, a citizen of the United States, residing at Wilderville, in the county of Josephine and State of Oregon, have invented a new and useful Clevis, of which the following is a specification.

The subject of this invention is a clevis, and the objects of the invention are, first, the production of a clevis which may be quickly attached and detached, second, the production of a clevis presenting two attaching ends, third, the production of a simple and efficient clevis.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A preferred form of the invention is shown in the accompanying drawing, wherein:—

Figure 1 is a fragmentary plan view of a wagon tongue and whiffletree with clevis constructed in accordance with the present invention, in place thereon.

Fig. 2 is a side elevation of the clevis.

Fig. 3 is a plan view of the clevis in open position.

Referring to the drawing by characters of reference:—

A wagon tongue is represented at T, to which is pivoted, by the pin P, the cross bar W of the whiffletree. The clevises are pivoted to the cross bar W and serve to connect thereto the swingletrees S and the stay chains C.

The clevis consists of two similar bars 1 and 2 bent to jointly form a central link or loop as shown and merging, at one end, into opposed hook like ends 3 and 4, respectively. At the opposite end the bars 1 and 2 merge into the opposed hook like ends 5 and 6, respectively, which ends are quarter turned or lie in planes at right angles to the planes of their respective bars. Each bar 1 and 2 is apertured at a central point and the aperture of the bar 2 is tapped to receive the threaded end of a pin 7 which holds the bars 1 and 2 together and serves to pivotally secure them to some part, such as the cross bar W of the whiffletree, as seen in Fig. 1. A further aperture is formed in each bar 1 and 2, respectively, and one of these apertures is tapped to receive a pin, 10, to lock the parts together, if so desired.

In practice the device is used as follows:—

The parts being pivotally secured in place through the pin 7, they may be loosened by giving the pin a turn and the two bars swing in opposite directions to separate the ends, as shown most clearly in Fig. 3. The ends may then be placed in position and brought together to pivotally engage a connecting link or loop.

This structure gives a ready means of connecting to and disconnecting from an implement, such as, for instance, a plow, or a harrow.

Having thus described the invention, what is claimed as new and sought by Letters-Patent, is:—

The combination with a wagon tongue and a tree thereon, of bars located above and below the tree at the end thereof and oppositely bowed in their intermediate portions to receive the end of the tree, the bars being provided at their ends with hooks coöperating to form eyes located substantially at right-angles to each other and disposed on opposite sides of the tree; a pin in the tree and forming both a pivotal mounting for the bars and a pivoted connection between the intermediate portions of the bars; and a second pin connecting the bars independently of the tree to prevent relative movement between the bars on the first-specified pin.

In testimony that I claim the foregoing as my own, I have hereto affixed my signature in the presence of two witnesses.

JOHN THOMAS WOOLFOLK.

Witnesses:
ALFRED LETCHER,
HORACE DAY.

Copies of this patent may be obtained for five cents each, by addressing the "Commissioner of Patents, Washington, D. C."